United States Patent
Seo et al.

(10) Patent No.: US 8,152,681 B2
(45) Date of Patent: Apr. 10, 2012

(54) GEAR TRAIN OF AUTOMATIC TRANSMISSION FOR VEHICLES

(75) Inventors: Kang Soo Seo, Suwon (KR); Hyu Tae Shim, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 393 days.

(21) Appl. No.: 12/436,357

(22) Filed: May 6, 2009

(65) Prior Publication Data
US 2009/0280947 A1     Nov. 12, 2009

(30) Foreign Application Priority Data
May 6, 2008  (KR) ................ 10-2008-0041990

(51) Int. Cl.
*F16H 3/44* (2006.01)
(52) U.S. Cl. ........ 475/269; 475/276; 475/275; 475/281; 475/330; 475/284

(58) Field of Classification Search ............... 475/269, 475/275, 278, 284, 285, 289, 296, 330, 281, 475/277, 276
See application file for complete search history.

(56) References Cited

U.S. PATENT DOCUMENTS

| | | | | |
|---|---|---|---|---|
| 3,503,282 | A * | 3/1970 | Peterson .................. | 475/276 |
| 7,553,253 | B2 * | 6/2009 | Kamada et al. ............ | 475/284 |
| 7,749,128 | B2 * | 7/2010 | Kamada et al. ............ | 475/280 |
| 7,798,932 | B2 * | 9/2010 | Wittkopp et al. .......... | 475/269 |
| 7,841,960 | B2 * | 11/2010 | Baldwin .................. | 475/280 |
| 7,854,678 | B2 * | 12/2010 | Kim ........................ | 475/276 |
| 7,862,472 | B2 * | 1/2011 | Kawaguchi et al. ........ | 477/97 |
| 2007/0060439 | A1 * | 3/2007 | Kamada et al. ............ | 475/284 |

* cited by examiner

*Primary Examiner* — David D Le
*Assistant Examiner* — Jude Agendia
(74) *Attorney, Agent, or Firm* — Morgan, Lewis & Bockius LLP

(57) ABSTRACT

A gear train of an automatic transmission for vehicles has the advantages of improving power delivery performance and reducing fuel consumption as a consequence of realizing more than eight forward speeds by combining four planetary gear sets with three clutches and three brakes.

8 Claims, 13 Drawing Sheets

FIG. 2

| shift speed | C1 | C2 | C3 | B1 | B2 | B3 | F | shift ratio | step ratio |
|---|---|---|---|---|---|---|---|---|---|
| D1 |  |  |  | ● | ○ |  | ● | 4.45 |  |
| D2 |  |  |  | ● |  | ● |  | 2.70 | 1.65 |
| D3 |  |  | ● | ● |  |  |  | 2.03 | 1.33 |
| D4 | ● |  |  | ● |  |  |  | 1.68 | 1.21 |
| D5 |  | ● |  | ● |  |  |  | 1.33 | 1.27 |
| D6 | ● | ● |  |  |  |  |  | 1.00 | 1.33 |
| D7 |  | ● | ● |  |  |  |  | 0.86 | 1.16 |
| D8 |  | ● |  |  |  | ● |  | 0.74 | 1.16 |
| RS1 |  |  | ● |  | ● |  |  | -5.33 | 5.98 |
| RS2 | ● |  |  |  | ● |  |  | -2.91 |  |

GEAR TRAIN OF AUTOMATIC TRANSMISSION FOR VEHICLES

CROSS-REFERENCE TO RELATED APPLICATION

This application claims priority to and the benefit of Korean Patent Application No. 10-2008-0041990 filed in the Korean Intellectual Property Office on May 6, 2008, the entire contents of which are incorporated herein for all purposes by this reference.

BACKGROUND OF THE INVENTION

1. Field of the Invention

The present invention relates to a gear train of an automatic transmission for vehicles which provides at least eight forward speeds by combining four planetary gear sets with three clutches and three brakes.

2. Description of the Related Art

A typical shift mechanism of an automatic transmission utilizes a combination of a plurality of planetary gear sets. A gear train of such an automatic transmission that includes the plurality of planetary gear sets changes rotation speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a gear train of an automatic transmission for vehicles having advantages of improving power delivery performance and reducing fuel consumption as a consequence of realizing more than eight forward speeds by combining four planetary gear sets with three clutches and three brakes.

A gear train of an automatic transmission for vehicles according to an exemplary embodiment of the present invention may include: a first planetary gear set being a first simple planetary gear set having three rotation elements, and forming a first input pathway that receives a rotation speed input from an input shaft and outputs an increased rotation speed; a second planetary gear set formed by combining second, third, and fourth simple planetary gear sets such that one rotation element of the second simple planetary gear set is connected to one rotation element of the third simple planetary gear set, another rotation element of the third simple planetary gear set is connected to one rotation element of the fourth simple planetary gear set, and another rotation element of the fourth simple planetary gear set is connected to another rotation element of the second simple planetary gear set to have six rotation elements, and outputting a target rotation speed by using the reduced rotation speed selectively input from the first planetary gear set and the rotation speed of the input shaft input through a second input pathway and first and second variable input pathways; and a plurality of friction members including first, second, and third clutches that are disposed on the first and second variable input pathways and first, second, and third brakes that selectively connect some rotation elements of the first and second planetary gear sets to a transmission housing.

The first planetary gear set may be a single pinion planetary gear set having a first sun gear, a first ring gear, and a first planet carrier as rotation elements thereof, wherein the first sun gear directly connected to the transmission housing is operated as a first rotation element, the first planet carrier forming an intermediate output pathway is operated as a second rotation element, and the first ring gear forming the first input pathway that is directly connected to the input shaft is operated as a third rotation element.

The second planetary gear set may include the second simple planetary gear set that is a single pinion planetary gear set and has a second sun gear, a second ring gear, and a second planet carrier as rotation elements thereof, the third simple planetary gear set that is a single pinion planetary gear set and has a third sun gear, a third ring gear, and a third planet carrier as rotation elements thereof, and the fourth simple planetary gear set that is a double pinion planetary gear set and has a fourth sun gear, a fourth ring gear, and a fourth planet carrier as rotation elements thereof, wherein the second planet carrier is connected to the third ring gear, the third planet carrier is connected to the fourth planet carrier, and the fourth ring gear is connected to the second ring gear such that the third sun gear is operated as a fourth rotation element, the second sun gear is operated as a fifth rotation element, the third and fourth planet carriers are operated as a sixth rotation element, the second planet carrier and the third ring gear are operated as a seventh rotation element, the second ring gear and the fourth ring gear are operated as an eighth rotation element, and the fourth sun gear is operated as a ninth rotation element, and wherein the fourth rotation element is selectively connected to the input shaft and the second rotation element through the first variable input pathway and is selectively connected to the transmission housing, the fifth rotation element is selectively connected to the transmission housing, the sixth rotation element is selectively connected to the transmission housing and is selectively connected to the input shaft through the second variable input pathway, the seventh rotation element is connected to an output gear through an output pathway, the eighth rotation element is operated as an idle element, and the ninth rotation element is directly connected to the input shaft through the second input pathway.

The friction members may include: the first clutch disposed between the input shaft and the fourth rotation element; the second clutch disposed between the input shaft and the sixth rotation element; the third clutch disposed between the second rotation element and the fourth rotation element; the first brake disposed between the transmission housing and the fifth rotation element; the second brake disposed between the transmission housing and the sixth rotation element; and the third brake disposed between the transmission housing and the fourth rotation element.

The second brake B2 may be disposed in parallel with a one-way clutch.

According to another exemplary embodiment of the present invention, the first planetary gear set may be a double pinion planetary gear set having a first sun gear, a first ring gear, and a first planet carrier as rotation elements thereof, wherein the first sun gear directly connected to the transmission housing is operated as a first rotation element, the first ring gear forming an intermediate output pathway is operated as a second rotation element, and the first planet carrier forming the first input pathway that is directly connected to the input shaft is operated as a third rotation element.

BRIEF DESCRIPTION OF THE DRAWINGS

FIG. 2 is an operational chart for a gear train according to exemplary embodiments of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
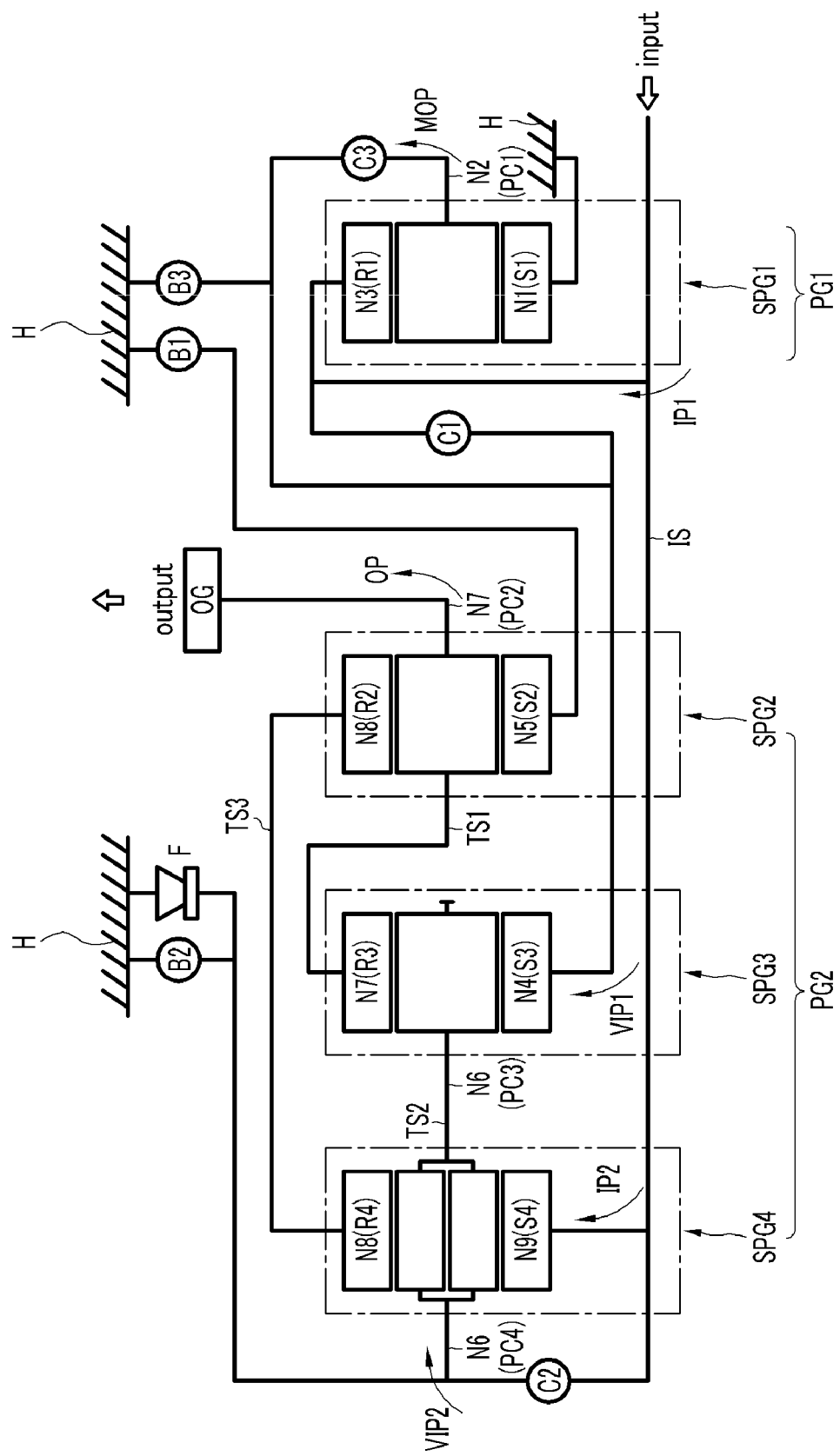
FIG. 1 is a schematic diagram of a gear train according to the first exemplary embodiment of the present invention.

FIG. 1 shows a gear train according to the first exemplary embodiment of the present invention. The gear train includes first, second, third, and fourth simple planetary gear sets SPG1, SPG2, SPG3, and SPG4 disposed on the same axis, clutch means consisting of three clutches C1, C2, and C3, and brake means consisting of three brakes B1, B2, and B3.

The first, second, third, and fourth simple planetary gear sets SPG1, SPG2, SPG3, and SPG4 are sequentially disposed on an input shaft IS from an engine. A first planetary gear set PG1 including the first simple planetary gear set SPG1 reduces a rotation speed input from the input shaft IS and outputs a reduced rotation speed. A second planetary gear set PG2 including the second, third, and fourth simple planetary gear sets SPG2, SPG3, and SPG4 changes the reduced rotation speed selectively input from the first planetary gear set PG1 and the rotation speed of the input shaft IS input through one input pathway IP2 and two variable input pathways VIP1 and VIP2 into eight forward speeds and two reverse speeds and outputs the same through an output pathway OP.

The input shaft IS is an input member and represents a turbine shaft of a torque converter. Therefore, torque transmitted from a crankshaft of the engine to the torque converter is converted and then input to the gear train through the turbine shaft. A rotation speed changed in the gear train is transmitted to a well-known differential apparatus through an output gear OG of an output member.

The first simple planetary gear set SPG1 is a single pinion planetary gear set, and the first simple planetary gear set SPG1 includes a first sun gear S1, a first planet carrier PC1 supporting a plurality of pinions engaged with the first sun gear S1, and a first ring gear R1 engaged with the pinions as rotation elements thereof.

The second simple planetary gear set SPG2 is a single pinion planetary gear set, and includes a second sun gear S2, a second planet carrier PC2 supporting a plurality of pinions engaged with the second sun gear S2, and a second ring gear R2 engaged with the pinions as rotation elements thereof.

The third simple planetary gear set SPG3 is a single pinion planetary gear set, and includes a third sun gear S3, a third planet carrier PC3 supporting a plurality of pinions engaged with the third sun gear S3, and a third ring gear R3 engaged with the pinions as rotation elements thereof.

The fourth simple planetary gear set SPG4 is a double pinion planetary gear set, and includes a fourth sun gear S4, a fourth planet carrier PC4 supporting a plurality of pinions engaged with the fourth sun gear S4, and a fourth ring gear R4 engaged with the pinions as rotation elements thereof.

The first planetary gear set PG1 including the first simple planetary gear set SPG1 outputs the reduced rotation speed. For this purpose, the first sun gear S1 of a first rotation element N1 is directly connected to the transmission housing H and is always operated as a fixed element, the first planet carrier PC1 of a second rotation element N2 forms an intermediate output pathway MOP that reduces a rotation speed input to the first ring gear R1 and outputs a reduced rotation speed, and the first ring gear R1 of a third rotation element N3 forms a first input pathway IP1 that is directly connected to the input shaft IS.

The second planetary gear set PG2 consisting of the second, third, and fourth simple planetary gear sets SPG2, SPG3, and SPG4 is combined such that the second planet carrier PC2 is connected to the third ring gear R3 through a first power transmitting member TS1, the third planet carrier PC3 is connected to the fourth planet carrier PC3 through a second power transmitting member TS2, the fourth ring gear R4 is connected to the second ring gear R2 through a third power transmitting member TS3 to have six rotation elements.

That is, the six rotation elements include the third sun gear S3 of a fourth rotation element N4, the second sun gear S2 of a fifth rotation element N5, the third and fourth planet carriers PC3 and PC4 of a sixth rotation element N6, the second planet carrier PC2 and the third ring gear R3 of a seventh rotation element N7, the second ring gear R2 and the fourth ring gear R4 of an eighth rotation element N8, and the fourth sun gear S4 of a ninth rotation element N9.

The third sun gear S3 of the fourth rotation element N4 is selectively connected to the input shaft IS by interposing the first clutch C1 therebetween and is selectively connected to the first planet carrier PC1 of the second rotation element N2 by interposing the third clutch C3 therebetween. The third and fourth planet carriers PC3 and PC4 of the sixth rotation element N6 are selectively connected to the input shaft IS by interposing the second clutch C2 therebetween.

The second sun gear S2 of the fifth rotation element N5 is selectively connected to the transmission housing H by interposing the first brake B1 therebetween, and the second and third planet carriers PC2 and PC3 of the sixth rotation element N6 are selectively connected to the transmission housing H by interposing therebetween a one-way clutch F and the second brake B2 disposed in parallel with each other, and the third sun gear S3 of the fourth rotation element N4 is selectively connected to the transmission housing H by interposing the third brake B3 therebetween.

Accordingly, the fourth rotation element N4 forms the first variable input pathway VIP1 where the rotation speed of the input shaft IS and the reduced rotation speed of the first planetary gear set PG1 are input and is operated as a selective fixed member.

In addition, the fifth rotation element N5 is operated as a selective fixed member, the sixth rotation element N6 forms the second variable input pathway VIP2 and is operated as a selectively fixed member, the seventh rotation element N7 is connected to an output gear OG so as to form a final output pathway OP, the eighth rotation element N8 is operated as an idle element, and the ninth rotation element N9 forms the second input pathway IP2 where the rotation speed of the input shaft IS is always input.

In addition, the third clutch C3 is disposed at a front portion of the first simple planetary gear set SPG1, the first and third brakes B1 and B3 are disposed at an exterior circumferential portion of the first simple planetary gear set SPG1, the first clutch C1 is disposed between the first and second simple planetary gear sets SPG1 and SPG2, the one-way clutch F and the second brake B2 are disposed at an exterior circumferential portion of the second, third, and fourth simple planetary gear sets SPG2, SPG3, and SPG4, and the second clutch C2 is disposed at a rear portion of the fourth simple planetary gear set SPG4.

If the friction elements are dispersed as described above, formation of hydraulic lines for supplying hydraulic pressure to such friction elements may be simplified, and weight balance in the automatic transmission may be enhanced.

The friction members consisting of the first, second, and third clutches C1, C2, and C3 and the first, second, and third brakes B1, B2, and B3 are conventional multi-plate friction members of wet type that are operated by hydraulic pressure. The friction members are connected to a hydraulic pressure control apparatus and are operated or released by a control of a transmission control unit (not shown) according to a driving condition.

FIG. 2 is an operational chart that shows friction elements (clutches and brakes) operated at each shift speed for exemplary embodiments of the present invention, and ● means an operation of the friction members. According to exemplary embodiments of the present invention, three friction members are operated so as to achieve shifting at each shift speed.

That is, the first brake B1 and the one-way clutch F are operated at a first forward speed, the second and third brakes B2 and B3 are operated at a second forward speed, the third clutch C3 and the first brake B1 are operated at a third forward speed, the first clutch C1 and the first brake B1 are operated at a fourth forward speed, the second clutch C2 and the first brake B1 are operated at a fifth forward speed, the first and second clutches C1 and C2 are operated at a sixth forward speed, the second and third clutches C2 and C3 are operated at a seventh forward speed, the second clutch C2 and the third brake B3 are operated at an eighth forward speed, the third clutch C3 and the second brake B2 are operated at a first reverse speed, and the first clutch C1 and the second brake B2 are operated at a second reverse speed.

FIG. 3 to FIG. 11 show shift processes according to exemplary embodiments of the present invention. In the drawings, a lower horizontal line represents a rotation speed is "0", and an upper horizontal line represents a rotation speed is "1.0", that is, the rotation speed thereof is the same as that of the input shaft IS.

Three vertical lines of the first planetary gear set PG1 including the first simple planetary gear set SPG1 in the drawings represent the first sun gear S1 of the first rotation element N1, the first planet carrier PC1 of the second rotation element N2, and the first ring gear R1 of the third rotation element N3 sequentially from the left, and distances therebetween are set according to gear ratio of the first simple planetary gear set SPG1 (teeth number of the sun gear/teeth number of the ring gear).

Six vertical lines of the second planetary gear set PG2 including the second, third, and fourth simple planetary gear sets PG2, PG3, and PG4 in the drawings represent the third sun gear S3 of the fourth rotation element N4, the second sun gear S2 of the fifth rotation element N5, the third and fourth planet carriers PC3 and PC4 of the sixth rotation element N6, the second planet carrier PC2 and the third ring gear R3 of the seventh rotation element N7, the second ring gear R2 and the fourth ring gear R4 of the eighth rotation element N8, and the fourth sun gear S4 of the ninth rotation element N9 sequentially from the left, and distances therebetween are set according to each gear ratio of the second, third, and fourth simple planetary gear sets SPG2, SPG3, and SPG4 (teeth number of the sun gear/teeth number of the ring gear).

Position of each rotation element in the lever diagram is well known to a person of an ordinary skill in the art who designs a gear train, and thus detailed description will be omitted.

The First Forward Speed

In the first forward speed, as shown in FIG. 2, the first brake B1 and the one-way clutch (F) are operated.

Figure 3:
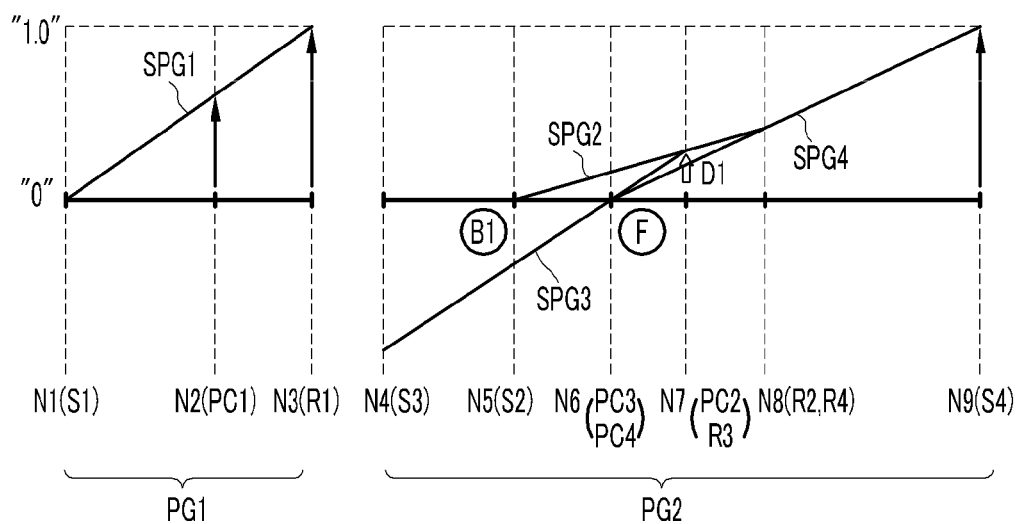
FIG. 3 is a lever diagram at a first forward speed.

Then, as shown in FIG. 3, in the first planetary gear set PG1 receives torque from the input shaft IS, however, the first planetary gear set PG1 does not participate in the shifting.

The ninth rotation element N9 receives the torque from the input shaft IS through the second input pathway IP2 and the fifth rotation element N5 and the sixth rotation element N6 are operated as fixed elements by operations of the first brake B1 and the one-way clutch (F). Therefore, speed lines of the first forward speed are formed as a result of cooperation of the second, third, and fourth simple planetary gear sets SPG2, SPG3, and SPG4 and the seventh rotation element N7 outputs the first forward speed D1. Herein, exemplary speed ratio is 4.45.

The Second Forward Speed

In the state of the first forward speed D1, as shown in FIG. 2, the third brake B3 is operated and the one-way clutch (F) is released to achieve the second forward speed D2.

Figure 4:
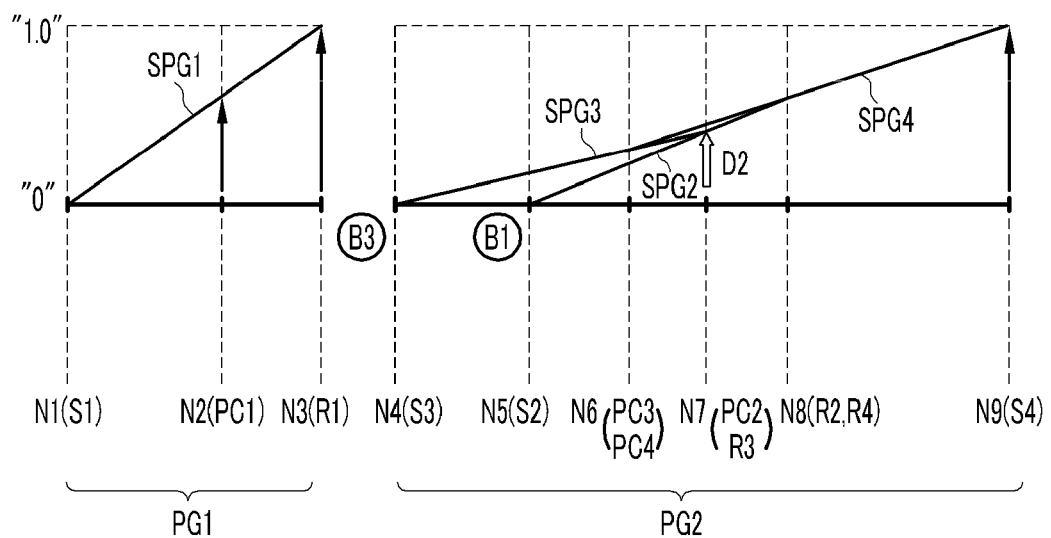
FIG. 4 is a lever diagram at a second forward speed.

Then, as shown in FIG. 4, in the first planetary gear set PG1 receives the torque from the input shaft IS, however, the first planetary gear set PG1 does not participate in the shifting.

Then, the ninth rotation element N9 receives the torque from the input shaft IS through the second input pathway IP2, and the fourth rotation element N4 and the fifth rotation element N5 are operated as fixed elements by operations of the first brake B1 and the third brake B3. Therefore, speed lines of the second forward speed are formed as a result of cooperation of the second, third, and fourth simple planetary gear sets SPG2, SPG3, and SPG4 and the seventh rotation element N7 outputs the second forward speed D2. Herein, exemplary speed ratio is 2.70.

The Third Forward Speed

In the state of the second forward speed D2, as shown in FIG. 2, the third brake B3 is released and the third clutch C3 is operated to achieve the third forward speed D3.

Figure 5:
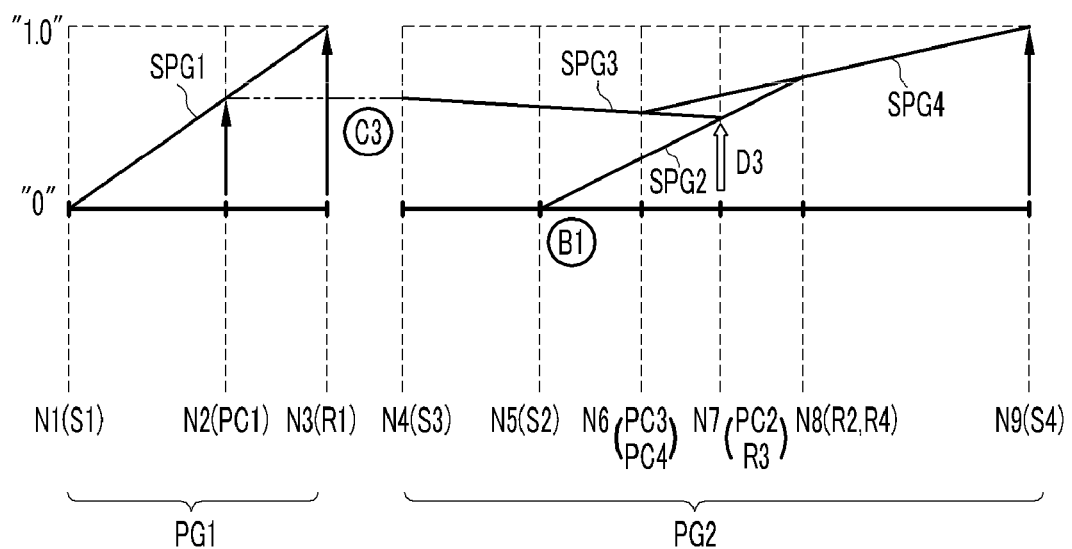
FIG. 5 is a lever diagram at a third forward speed.

Then, as shown in FIG. 5, the ninth rotation element N9 receives the torque from the input shaft IS through the second input pathway IP2, reduced rotational speed of the second rotation element N2 outputting from the intermediate output pathway (MOP) by an operation of the third clutch C3 is transmitted to the fourth rotation element N4 via the first variable input pathway VIP1 and the fifth rotation element N5 is operated as a fixed element by an operation of the first brake B1.

Therefore, speed lines of the third forward speed are formed as a result of cooperation of the second, third, and fourth simple planetary gear sets SPG2, SPG3, and SPG4 and the seventh rotation element N7 outputs the third forward speed D3. Herein, exemplary speed ratio is 2.03.

The Fourth Forward Speed

In the state of the third forward speed D3, as shown in FIG. 2, the third clutch C3 is released and the first clutch C1 is operated to achieve the fourth forward speed D4.

Figure 6:
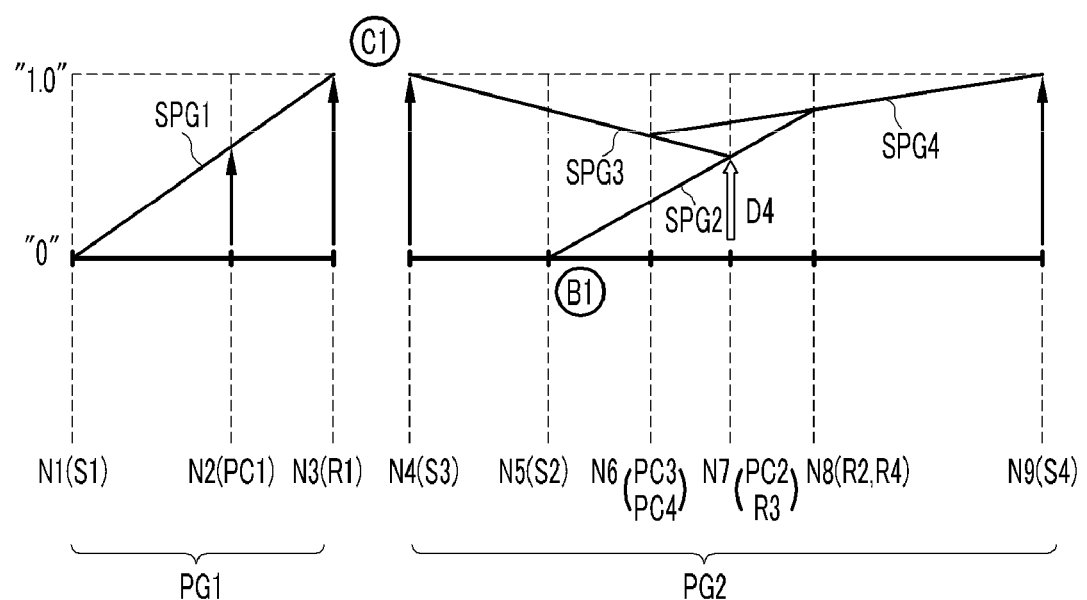
FIG. 6 is a lever diagram at a fourth forward speed.

Then, as shown in FIG. 6, the ninth rotation element N9 receives the torque from the input shaft IS through the second input pathway IP2, the torque from the input shaft IS is transmitted to the fourth rotation element N4 via the first variable input pathway VIP1 by an operation of the first clutch C1 and the fifth rotation element N5 is operated as a fixed element by an operation of the first brake B1.

Therefore, speed lines of the fourth forward speed are formed as a result of cooperation of the second, third, and fourth simple planetary gear sets SPG2, SPG3, and SPG4 and the seventh rotation element N7 outputs the fourth forward speed D4. Herein, exemplary speed ratio is 1.68.

The Fifth Forward Speed

In the state of the fourth forward speed D4, as shown in FIG. 2, first clutch C1 is released and the second clutch C2 is operated to achieve the fifth forward speed D5.

Figure 7:
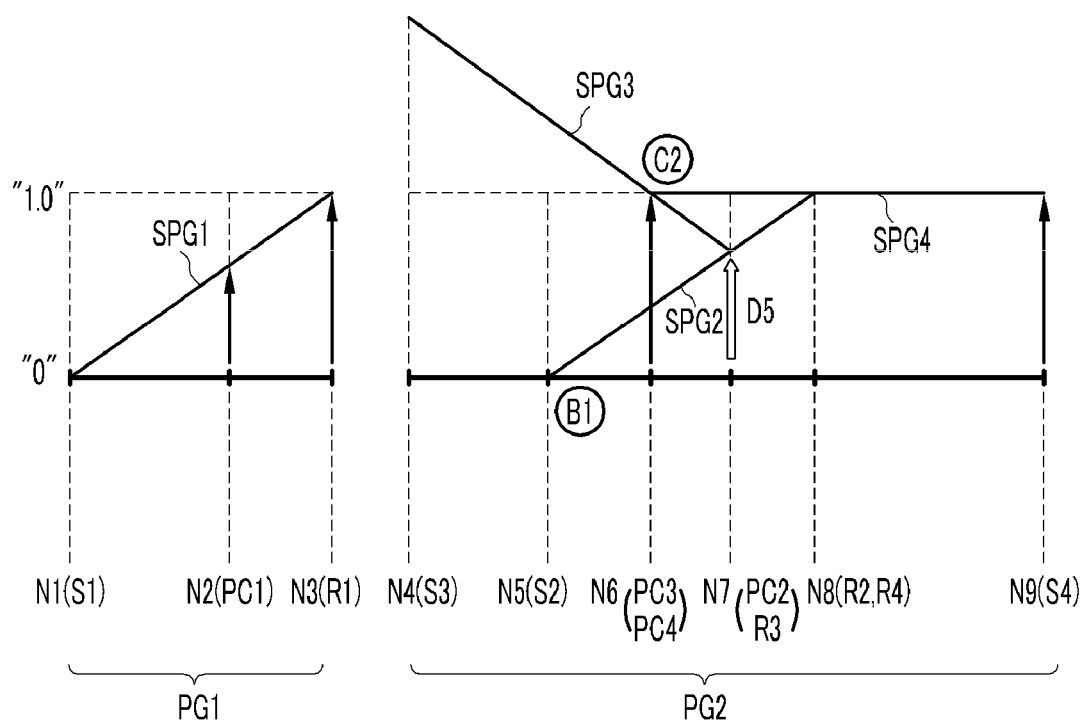
FIG. 7 is a lever diagram at a fifth forward speed.

Then, as shown in FIG. 7, the ninth rotation element N9 receives the torque from the input shaft IS through the second input pathway IP2, the sixth rotation element N6 receives the torque from the input shaft IS through the second variable input pathway VIP2 by an operation of the second clutch C2 and the fifth rotation element N5 is operated as a fixed element by an operation of the first brake B1.

Therefore, speed lines of the fifth forward speed are formed as a result of cooperation of the second, third, and fourth simple planetary gear sets SPG2, SPG3, and SPG4 and the seventh rotation element N7 outputs the fifth forward speed D5. Herein, exemplary speed ratio is 1.33.

The Sixth Forward Speed

In the state of the fifth forward speed D5, as shown in FIG. 2, the first brake B1 is released and the first clutch C1 is operated to achieve the sixth forward speed D6.

Figure 8:
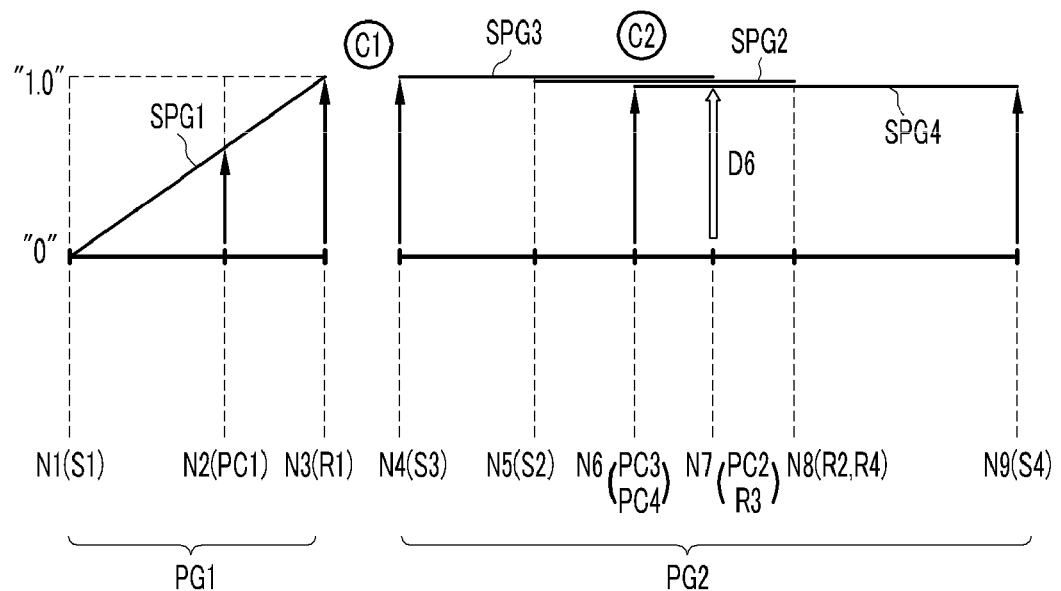
FIG. 8 is a lever diagram at a sixth forward speed.

Then, as shown in FIG. 8, the ninth rotation element N9 receives the torque from the input shaft IS through the second input pathway IP2 and the torque from the input shaft IS is transmitted to the fourth rotation element N4 and the sixth rotation element N6 via the first and second variable input pathway VIP1 and VIP2 by operations of the first and second clutch C1 and C2.

Therefore, the second, third, and fourth simple planetary gear set SPG2, SPG3, and SPG4 rotates at the speed of the input shaft IS and the seventh rotation element N7 outputs the sixth forward speed D6. Herein, exemplary speed ratio is 1.00.

The Seventh Forward Speed

In the state of the sixth forward speed D6, as shown in FIG. 2, the first clutch C1 is released and the third clutch C3 is operated to achieve the seventh forward speed D7.

Figure 9:
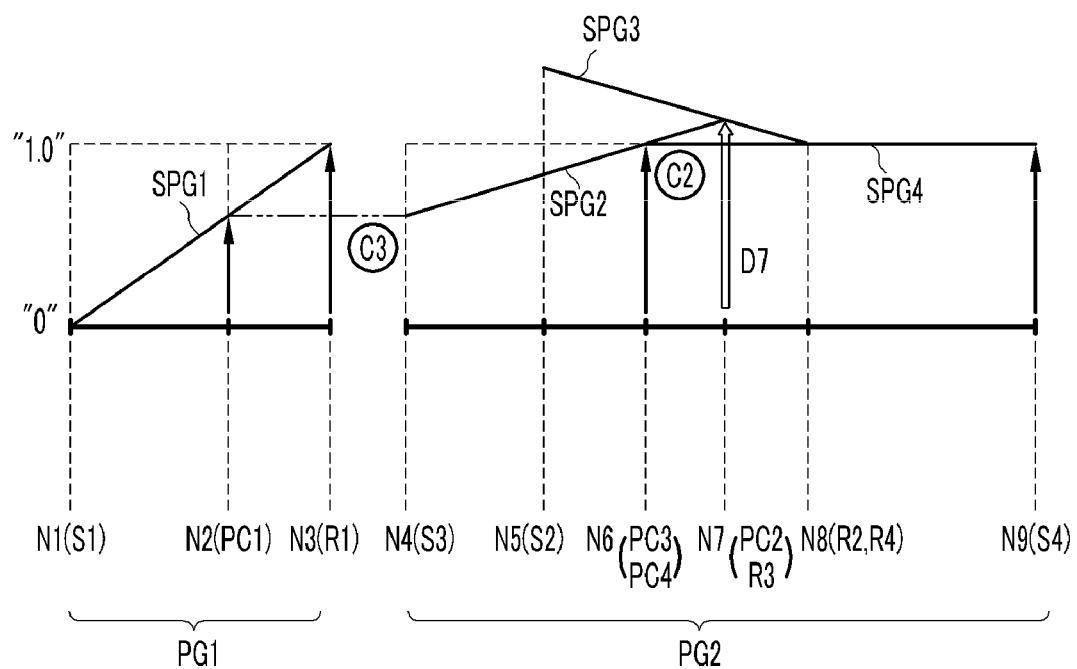
FIG. 9 is a lever diagram at a seventh forward speed.
Figure 10:
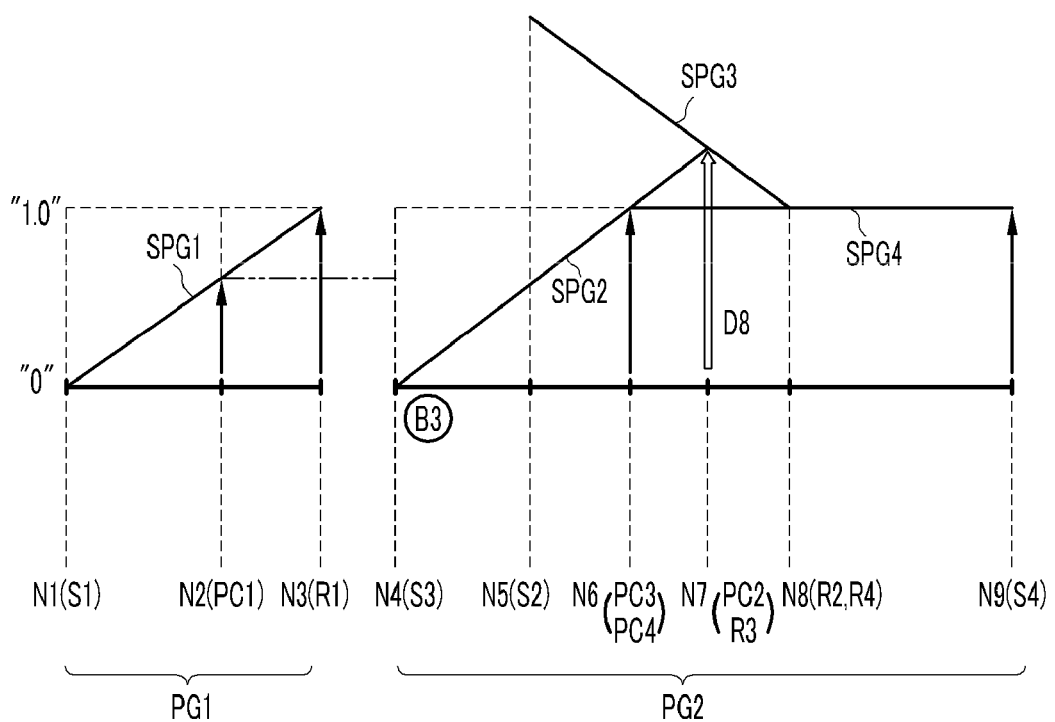
FIG. 10 is a lever diagram at an eighth forward speed.

Then, as shown in FIG. 9, the ninth rotation element N9 receives the torque from the input shaft IS through the second input pathway IP2, the sixth rotation element N6 receives the torque from the input shaft IS through the second variable input pathway VIP2 by an operation of the second clutch C2 and the reduced rotational speed of the second rotation element N2 outputting from the intermediate output pathway (MOP) by an operation of the third clutch C3 is transmitted to the fourth rotation element N4 via the first variable input pathway VIP1.

Therefore, speed lines of the seventh forward speed are formed as a result of cooperation of the second, third, and fourth simple planetary gear sets SPG2, SPG3, and SPG4 and the seventh rotation element N7 outputs the seventh forward speed D7. Herein, exemplary speed ratio is 0.86.

The Eighth Forward Speed

In the state of the seventh forward speed D7, as shown in FIG. 2, the third clutch C3 is released and the third brake B3 is operated to achieve the eighth forward speed D8.

Then, as shown in FIG. 9, the ninth rotation element N9 receives the torque from the input shaft IS through the second input pathway IP2, the sixth rotation element N6 receives the torque from the input shaft IS through the second variable input pathway VIP2 by an operation of the second clutch C2 and the fourth rotation element N4 is operated as a fixed element by an operation of the third brake B3.

Therefore, speed lines of the eighth forward speed are formed as a result of cooperation of the second, third, and fourth simple planetary gear sets SPG2, SPG3, and SPG4 and the seventh rotation element N7 outputs the eighth forward speed D8. Herein, exemplary speed ratio is 0.74.

The First Reverse Speed

In the first reverse speed, as shown in FIG. 2, the third clutch C3 and the second brake B2 are operated.

Figure 11:
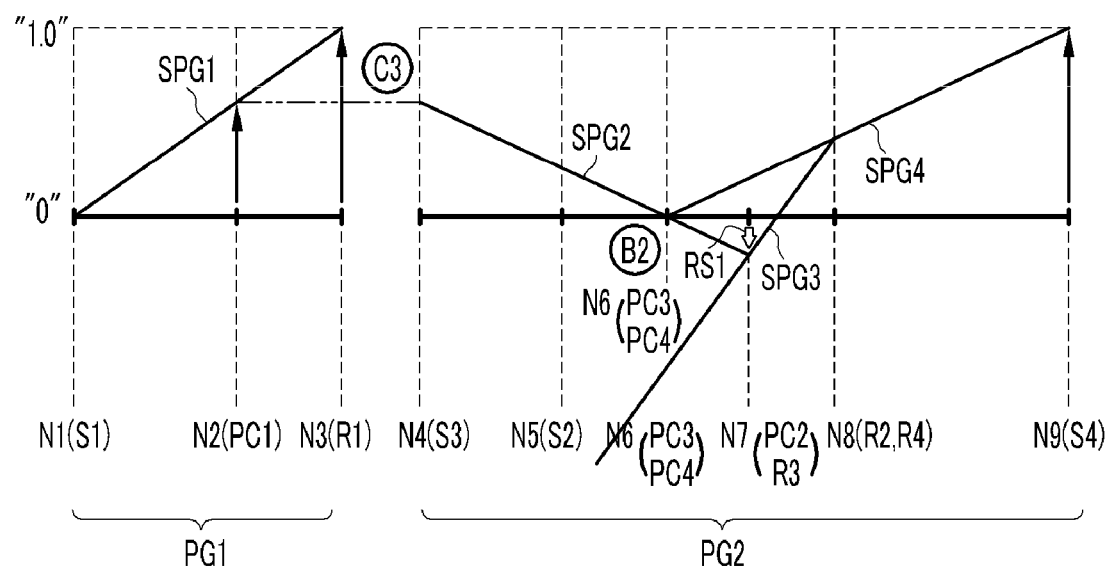
FIG. 11 is a lever diagram at a first reverse speed.

Then, as shown in FIG. 11, the ninth rotation element N9 receives the torque from the input shaft IS through the second input pathway IP2, reduced rotational speed of the second rotation element N2 outputting from the intermediate output pathway (MOP) by an operation of the third clutch C3 is transmitted to the fourth rotation element N4 via the first variable input pathway VIP1 and the sixth rotation element N6 is operated as a fixed element by an operation of the second brake B2.

Therefore, speed lines of the first reverse speed are formed as a result of cooperation of the second, third, and fourth simple planetary gear sets SPG2, SPG3, and SPG4 and the seventh rotation element N7 outputs the first reverse speed RS1. Herein, exemplary speed ratio is −5.33.

The Second Reverse Speed

In the state of the first reverse speed RS1, as shown in FIG. 2, the third clutch C3 is released and the first clutch C1 is operated to achieve the second reverse speed RS2.

Figure 12:
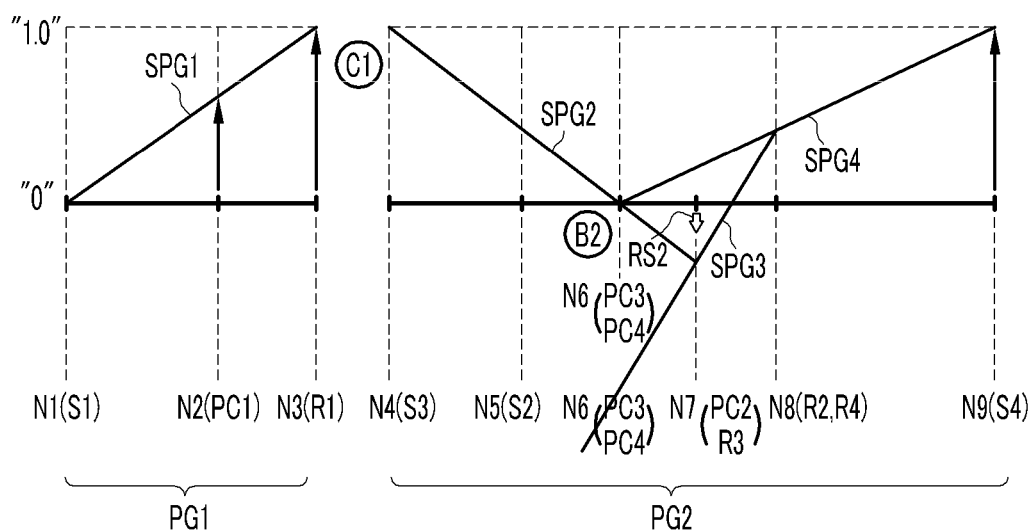
FIG. 12 is a lever diagram at a second reverse speed.

Then, as shown in FIG. 12, the ninth rotation element N9 receives the torque from the input shaft IS through the second input pathway IP2, the fourth rotation element N4 receives the torque from the input shaft IS via the first variable input pathway VIP1 by an operation of the first clutch C1 and the sixth rotation element N6 is operated as a fixed element by an operation of the second brake B2.

Therefore, speed lines of the second reverse speed are formed as a result of cooperation of the second, third, and fourth simple planetary gear sets SPG2, SPG3, and SPG4 and the seventh rotation element N7 outputs the second reverse speed RS2. Herein, exemplary speed ratio is −2.91.

Figure 13:
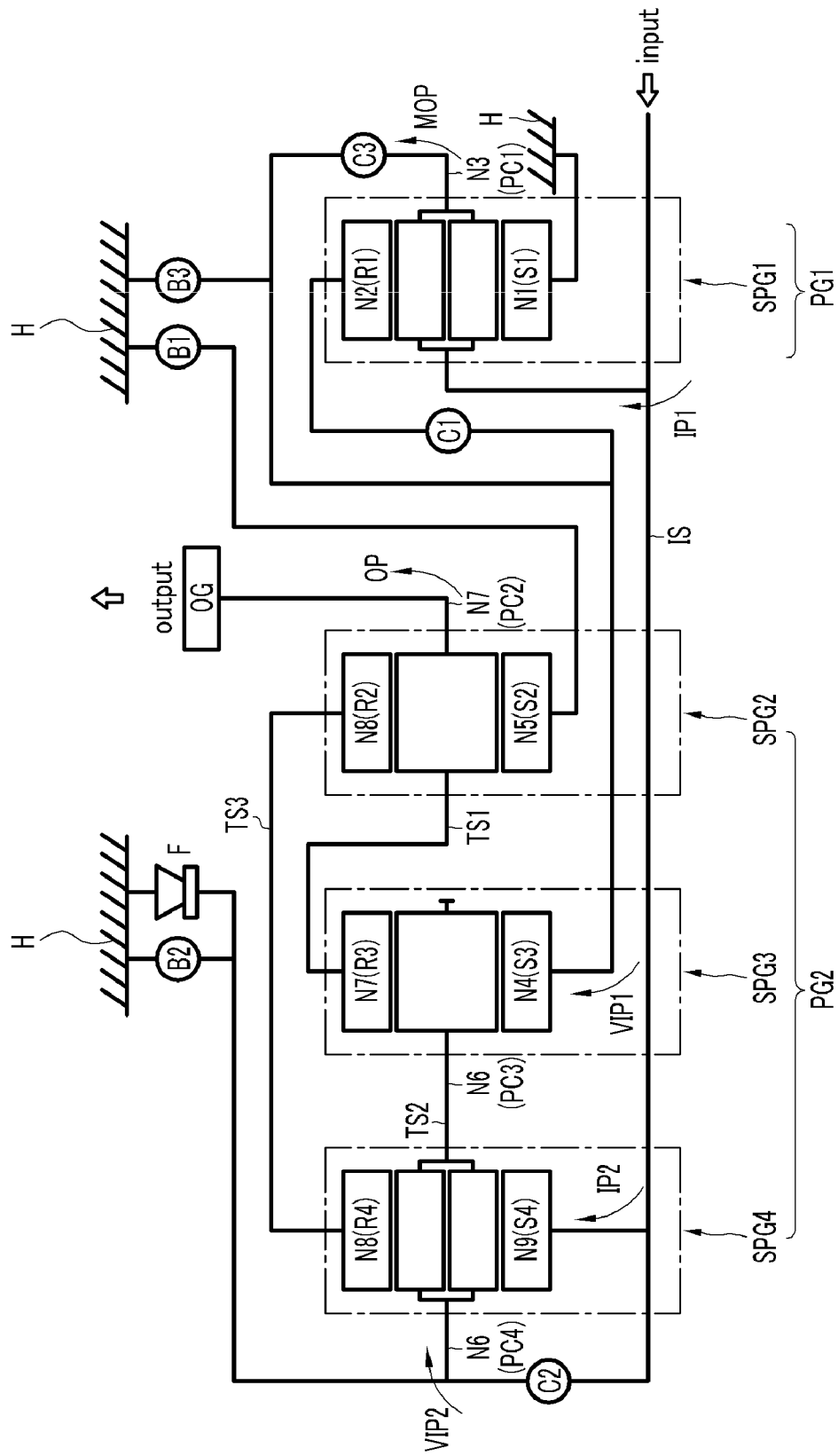
FIG. 13 is a schematic diagram of a gear train according to the second exemplary embodiment of the present invention.

FIG. 13 shows a gear train according to the second exemplary embodiment of the present invention. The second planetary gear set PG2 of the second exemplary embodiment is the same as that of the first exemplary embodiment, but the first planetary gear set PG1 is a double pinion planetary gear set.

Accordingly, the first planet carrier PC1 is changed from the second rotation element N2 to the third rotation element N3 and the first ring gear R1 is changed from the third rotation element N3 to the second rotation element N2.

The second and third rotation elements N2 and N3 are changed to each other according to the second exemplary embodiment but operations and shifting processes of the second exemplary embodiment is the same as those of the first exemplary embodiment. Therefore, detailed description will be omitted.

Since exemplary embodiments of the present invention realize eight forward speeds and two reverse speeds by combining four planetary gear sets with three clutches, three brakes, and one one-way clutch, power delivery performance may be improved and fuel consumption may be reduced.

Since the plurality of friction members are dispersed, formation of hydraulic lines may be simplified.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for vehicles, comprising:
    a first planetary gear set being a first simple planetary gear set having three rotational elements, and forming a first input pathway that receives a rotational speed input from an input shaft and outputs an increased rotational speed;
    a second planetary gear set formed by combining second, third, and fourth simple planetary gear sets such that one rotational element of the second simple planetary gear set is connected to one rotational element of the third simple planetary gear set, another rotational element of the third simple planetary gear set is connected to one rotational element of the fourth simple planetary gear set, and another rotational element of the fourth simple planetary gear set is connected to another rotational element of the second simple planetary gear set to have six rotational elements, and outputting a target speed by using a reduced rotational speed selectively input from the first planetary gear set and the rotational speed of the input shaft input through a second input pathway and first and second variable input pathways; and
    a plurality of friction members including first, second, and third clutches that are disposed on the first and second variable input pathways, and first, second, and third brakes that selectively connect selected rotational elements of the first and second planetary gear sets to a transmission housing,
    wherein the second planetary gear set comprises the second simple planetary gear set that is a single pinion planetary gear set and has a second sun gear, a second ring gear, and a second planet carrier as rotational elements thereof, the third simple planetary gear set that is a single pinion planetary gear set and has a third sun gear, a third ring gear, and a third planet carrier as rotational elements thereof, and the fourth simple planetary gear set that is a double pinion planetary gear set and has a fourth sun gear, a fourth ring gear, and a fourth planet carrier as rotational elements thereof,
    wherein the second planet carrier is connected to the third ring gear, the third planet carrier is connected to the fourth planet carrier, and the fourth ring gear is connected to the second ring gear such that the third sun gear is operated as a fourth rotational element, the second sun gear is operated as a fifth rotational element, the third and fourth planet carriers are operated as a sixth rotational element, the second planet carrier and the third ring gear are operated as a seventh rotational element, the second ring gear and the fourth ring gear are operated as an eighth rotational element, and the fourth sun gear is operated as a ninth rotational element, and
    wherein the fourth rotational element is selectively connected to the input shaft and the second rotational element through the first variable input pathway and is selectively connected to the transmission housing, the fifth rotational element is selectively connected to the transmission housing, the sixth rotational element is selectively connected to the transmission housing and is selectively connected to the input shaft through the second variable input pathway, the seventh rotational element is connected to an output gear through an output pathway, the eighth rotational element is operated as an idle element, and the ninth rotational element is directly connected to the input shaft through the second input pathway.

2. The gear train of claim 1, wherein the first planetary gear set is a single pinion planetary gear set having a first sun gear, a first ring gear, and a first planet carrier as rotational elements thereof, and
    wherein the first sun gear directly connected to the transmission housing is operated as a first stationary element, the first planet carrier forming an intermediate output pathway is operated as a second rotational element, and the first ring gear forming the first input pathway that is directly connected to the input shaft is operated as a third rotational element.

3. The gear train of claim 1, wherein the friction members comprises:
    the first clutch disposed between the input shaft and the fourth rotational element;
    the second clutch disposed between the input shaft and the sixth rotational element;
    the third clutch disposed between the second rotational element and the fourth rotational element;
    the first brake disposed between the transmission housing and the fifth rotational element;

the second brake disposed between the transmission housing and the sixth rotational element; and the third brake disposed between the transmission housing and the fourth rotational element.

4. The gear train of claim 3, further comprising a one-way clutch that is disposed between the transmission housing and the sixth rotational element and in parallel with the second brake.

5. The gear train of claim 1, wherein the first planetary gear set is a double pinion planetary gear set having a first sun gear, a first ring gear, and a first planet carrier as rotational elements thereof, and wherein the first sun gear directly connected to the transmission housing is operated as a first stationary element, the first ring gear is operated as a second rotational element, and the first planet carrier forming the first input pathway that is directly connected to the input shaft is operated as a third rotational element.

6. The gear train of claim 1, wherein the first and second planetary gear sets are disposed coaxially, and wherein the first simple planetary gear set forming the first planetary gear set is disposed toward an engine, and the second, third, and fourth simple planetary gear sets forming the second planetary gear set are sequentially dispose to the rear of the first simple planetary gear set.

7. A gear train of an automatic transmission for vehicles, comprising:

a first planetary gear set including a first simple planetary gear set that is a single pinion planetary gear set, and having a first sun gear, a first ring gear, and a first planet carrier as rotational elements thereof; and a second planetary gear set formed by combining a second simple planetary gear set of a single pinion planetary gear set having a second sun gear, a second ring gear, and a second planet carrier as rotational elements thereof, a third simple planetary gear set of a single pinion planetary gear set having a third sun gear, a third ring gear, and a third planet carrier as rotational elements thereof, and a fourth simple planetary gear set of a double pinion planetary gear set having a fourth sun gear, a fourth ring gear, and a fourth planet carrier as rotational elements thereof, such that the second planet carrier is connected to the third ring gear, the third planet carrier is connected to the fourth planet carrier, and the fourth ring gear is connected to the second ring gear, wherein the first sun gear directly connected to the transmission housing is operated as a first stationary element, the first planet carrier forming an intermediate output pathway is operated as the second rotational element, the first ring gear forming a first input pathway that is directly connected to the input shaft is operated as a third rotational element, the third sun gear selectively connected to the input shaft and the second rotational element through the first variable input pathway and selectively connected to the transmission housing is operated as a fourth rotational element, the second sun gear selectively connected to the transmission housing is operated as a fifth rotational element, the third and fourth planet carriers selectively connected to the transmission housing and selectively connected to the input shaft through the second variable input pathway are operated as a sixth rotational element, the second planet carrier and the third ring gear connected to an output gear through an output pathway are operated as the seventh rotational element, the second ring gear and the fourth ring gear operated as an idle element are operated as an eighth rotational element, and the fourth sun gear directly connected to the input shaft through the second input pathway is operated as a ninth rotational element.

8. A gear train of an automatic transmission for vehicles, comprising:

a first planetary gear set including a first simple planetary gear set that is a double pinion planetary gear set, and having a first sun gear, a first ring gear, and a first planet carrier as rotational elements thereof; and a second planetary gear set formed by combining a second simple planetary gear set of a single pinion planetary gear set having a second sun gear, a second ring gear, and a second planet carrier as rotational elements thereof, a third simple planetary gear set of a single pinion planetary gear set having a third sun gear, a third ring gear, and a third planet carrier as rotational elements thereof, and a fourth simple planetary gear set of a double pinion planetary gear set having a fourth sun gear, a fourth ring gear, and a fourth planet carrier as rotational elements thereof, such that the second planet carrier is connected to the third ring gear, the third planet carrier is connected to the fourth planet carrier, and the fourth ring gear is connected to the second ring gear, wherein the first sun gear of a first rotational element is directly connected to the transmission housing, the first planet carrier of a third rotational element forms a first input pathway that is directly connected to the input shaft, the third sun gear of a fourth rotational element is selectively connected to the second rotational element through a first variable input pathway and is selectively connected to the transmission housing, the second sun gear of a fifth rotational element is selectively connected to the transmission housing, the third and fourth planet carriers of a sixth rotational element is selectively connected to the transmission housing and is selectively connected to the input shaft through a second variable input pathway, the second planet carrier and the third ring gear of a seventh rotational element are connected to an output gear through an output pathway, the second ring gear and the fourth ring gear of an eighth rotational element are operated as an idle element, and the fourth sun gear of a ninth rotational element is directly connected to the input shaft through a second input pathway.

* * * * *